May 20, 1958
C. E. CORDES
2,835,706
PROCESS FOR PREPARING METHYL ETHYL
KETONE FROM SECONDARY BUTANOL
Filed May 4, 1956
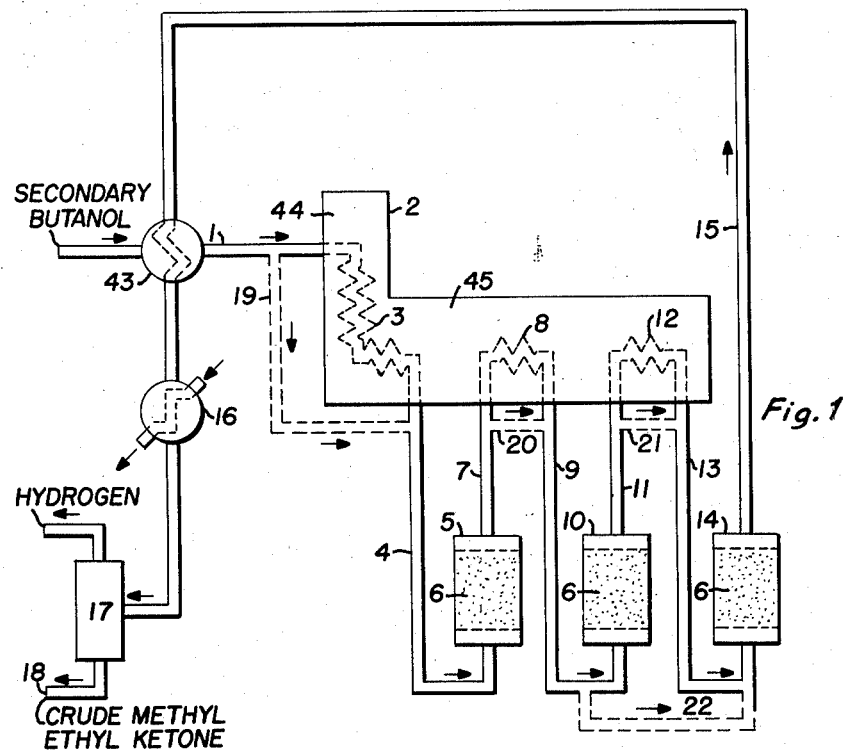
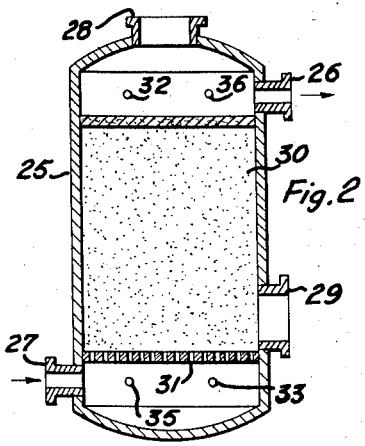
Charles E. Cordes    Inventor
By *Henry Berk*    Attorney

2,835,706

PROCESS FOR PREPARING METHYL ETHYL KETONE FROM SECONDARY BUTANOL

Charles E. Cordes, Roselle, N. J., assignor to Esso Research and Engineering Company, a corporation of Delaware Application May 4, 1956, Serial No. 582,835

5 Claims. (Cl. 260—596)

This invention relates to an improved process for the manufacture of ketones from the corresponding secondary alcohols. More particularly, this invention relates to an improved process of preparing methyl ethyl ketone from secondary butanol.

The commercial dehydrogenation of secondary butanol to methyl ethyl ketone is today generally carried out in the vapor phase over a solid catalyst. The alcohol is usually first vaporized, preheated and then passed through a plurality of long reactor tubes containing the solid catalyst. Since the dehydrogenation of secondary butanol is an endothermic reaction the reactor walls are directly heated by being positioned in a furnace in order to maintain the necessary temperatures for the dehydrogenation reaction. This heat requirement in the commercial production of methyl ethyl ketone has led to several problems which hitherto have not been solved. For example, it was found that the reactor walls had to be made of specified costly metals or ceramic materials which are able to withstand the necessary high heat applied to them in order to keep the vapors within the reactor tubes at a temperature between about 650°–900° F. Thus under normal operating conditions the reactor walls were necessarily heated to a temperature as high as about 1400° F. At these high temperatures undesirable coking occurs which reduces the life of the catalyst and conversion per time on stream. When coking does occur the effect is to cake the catalyst within the reactor, making it an extremely difficult task to remove spent catalyst. In fact, drilling is often required to remove spent catalyst which has been coked as a result of contact with the hot walls of the reactor tubes.

Further in the prior art processes the reactors were limited in diameter because of the inefficient heat transfer accompanying the direct application of heat to the reactor walls. Thus often fifty or more 6 inch diameter reactor tubes have been employed to handle 95 vol. percent secondary butanol when feeding 2000 gals./hr. Also due to the excessive heat required by the prior art processes frequent cleaning of the internal reactor tube walls by such means as turbining, scraping, and the like is required.

It is an object of the present invention to provide a simplified process of preparing methyl ethyl ketone on a commercial scale without the various disadvantages recited above in such a manner as to permit flexible and accurate control of the process.

In accordance with this invention secondary butanol vapors are preheated to at least the minimum reaction temperatures but not high enough to cause thermal cracking, and passed through a fixed catalyst bed within a reactor which does not have any separate heating means. The hot vapors which are the sole means of heating the bed to the necessary temperatures are permitted to travel preferably upwardly through the catalyst bed until they reach the minimum reaction temperatures below which no reaction occurs and are then passed from this reactor, reheated and fed to a second catalyst chamber. This cycle is repeated through one or more reactors until a conversion level of 75–85% is reached, whereupon the product vapors are cooled, thereby condensed and crude methyl ethyl ketone is separated from the hydrogen liberated during the reaction. The catalyst beds employed in accordance with the present invention will be of considerably lesser depth than the conventional type reactors and of considerably larger diameter. The size of the catalyst beds will depend upon the desired conversion to be effected in each of the reactors. However, they will be limited to a degree in diameter to permit good distribution of vapor throughout the entire bed.

To illustrate the invention reference is made to the accompanying drawing wherein Figure 1 represents a flow plan of this process. Figure 2 is a cross sectional view of a typical reactor.

Secondary butanol liquid or vapors may be preheated by the hot product vapors in any type of heat exchange such as indicated at 43. These vapors are then passed via line 1 to furnace 2. The incoming liquid may be vaporized and heated or if the alcohol has already been vaporized the vapors heated in coils or tubes 3 in the furnace convection section 44 alone or followed by heating in the radiant section 45 to temperatures of about 800°–900° F. and passed directly through line 4 to reactor or catalyst zone 5, said zones containing fixed catalyst beds 6. Substantially no thermal conversion or coking occurs within the coils or furnace tubes 3, 8 and 12 since the temperatures are maintained below about 950° F. and the residence time within said tubes is kept to a minimum, e. g. from about 1–10 seconds and preferably between 2–8 seconds. As previously noted, the size of reactors 5, 10 and 14 may vary. However, it is to be understood that the size will be not so large as to permit the vapor to cool substantialy below minimum reaction temperatures of about 650°–750° F. within said chamber. Preferable sizes for the reactor are from about 1.5 to 5 feet in diameter depending upon the efficiency of distribution achieved in the chamber and a height of from 4 to 20 feet depending upon the type of catalyst and packing utilized.

For a better understanding of the type reactor employed herein reference is now had to Figure 2 which is intended only to be a representation of one type of reactor which may be employed. Various other modifications thereof will be apparent. Reactor 25 comprises an outlet 26 and an inlet 27 which may be about 6 inches in diameter. Manheads 28 and 29 permit catalyst loading and removal. Catalyst bed 30 is supported on a perforated grid 31. Thermocouples 32 and 33 permit accurate control of the gas inlet and outlet temperatures. Gages 35 and 36 may be used to measure pressure drop to indicate signs of catalyst packing.

It is to be understood that any conventional dehydrogenation catalyst known for this general type process may be employed herein. Generally, however, oxides of the metals of group II of the periodic table are employed with the addition thereto of metallic oxides of group IV or group V as catalyst promoters, stabilizers, etc. For purposes of this invention the term "metallic oxide dehydrogenation catalyst" will designate an oxide of a metal, preferably a group II metal and 1 to 15% by weight of a metallic oxide of the IIIrd, IVth and Vth group of the periodic table. The catalytic metallic oxides function with a higher degree of efficiency when supported on a carrier than when used alone. Catalyst carriers which may be used are metallic machine turnings such as brass turnings, metallic chips, pumice, aluminum, porcelain, calcined coke, etc., of a size insuring good distribution of the oxide through the catalyst chamber. The metallic oxides preferably employed in the dehydrogenation catalyst are selected from the following group: zinc oxide, magnesium oxide, copper oxide, beryllium oxide, chromium oxide; while the following oxides are employed as stabilizers and promoters where desired: bismuth oxide, antimony oxide, zirconium oxide, thorium oxide, cerium oxide, vanadium oxide, etc. An especially preferred catalyst for this process is sodium carbonate, 4 to 8 wt. percent—zinc oxide 92 to 96 wt. percent supported on calcined coke. The weight ratio of active catalyst to support is not critical; however, generally from 1 to 10 wt. per cent catalyst based on the support should be employed. The catalyst should be packed to avoid channeling as much as possible. The particle size of the coke supported catalyst is preferably between ¼ to ½ inch but may vary if other supports are employed.

From reactor 5 effluent gases containing at least about 20 to 30% methyl ethyl ketone are passed via line 7 to a second heating coil 8 wherein the temperature of the vapor is raised to 800°–900° F. and passed via line 9 to reactor 10 and the same procedure is repeated via line 11, coil 12, line 13 and reactor 14. It is readily seen that additional circuits, i. e. reaction and heating cycles, may be added depending upon the size of the reactor, throughput volume, percentage methyl ethyl ketone desired in the end product, etc. The effluent from the final reactor 14 which will contain from about 75 to 85 wt. percent methyl ethyl ketone may then be passed via line 15 through a condenser 16 to separator 17 wherein hydrogen gas is removed. Pressure build-up within the system may be prevented by employing a pressure valve or controller on unit 17 where the hydrogen and methyl ethyl ketone are separated. The crude methyl ethyl ketone recovered via line 18 may then be distilled and finished in accordance with any of the known procedures to higher than 99% purity.

The catalyst chambers, preferably but not necessarily, are heavily insulated to permit longer residence time within the individual reactors while maintaining the necessary temperatures. Various other modifications of the above process may be employed without departing from the spirit of the invention. For example, some of the cooled alcohol feed may be permitted to bypass the furnace 2 via lines 19, 20 and 21 to more accurately control the temperature of the vapors which are to be introduced into the catalyst chambers without regulating the difficulty controllable furnace temperatures. However, the furnace coils or tubes 3, 8 and 12 should not be operated without vapors in them. The nature of the gas will of course change as it passes through each of the reactors; for example, the gas in tube 3 will comprise over 90% butanol whereas the gas in tubes 8 and 12 will contain increasing amounts of hydrogen and methyl ethyl ketone. To adjust for the increased volume and nature of the gas more heat is supplied to tubes 12 than 8 and more to 8 than 3. This may be accomplished by increasing the number of coils or furnace tubes at 12 and 8. Also it is to be understood that the catalyst chambers may comprise two or more in number. It is preferable to employ at least three reactors since in this type of process the catalyst which becomes spent within a relatively short period of time, e. g. 1400 hours, must be dumped and fresh catalyst added. Accordingly, means for bypassing a catalyst chamber, such as line 22, will preferably be employed so that one of the catalyst chambers may be shut down without interfering with the overall production of methyl ethyl ketone.

With regard to the feed stock, the secondary butanol employed should contain at least 90 wt. percent alcohol and less than about 0.5 wt. percent water. A higher percentage of water in the feed will tend to remove the catalyst from its carrier and thus require more frequent exchange of fresh catalyst. While the reaction is amenable to atmospheric conditions it may in some instances be desirable to employ pressures up to about 50 p. s. i. g. The feed rate may vary between 600 and 4000 gallons per hour, and the residence time per reactor between 10 and 200 seconds.

*Example*

In a typical run 99 wt. percent secondary butanol is supplied via line 1 at a rate of 2000 gallons per hour, heated to 900° F. in furnace tubes 3 and immediately passed without a substantial temperature drop to reactor 6 which is shown in Figure 2 in greater detail. Reactors 5, 10 and 14 are approximately 4 feet in diameter and 17½ feet high. The gaseous product mixture after passing through reactors 5, 10 and 14 wherein the exit temperatures are maintained at about 650° F., is cooled by a conventional heat exchange to about 50° F. whereby methyl ethyl ketone is condensed and separated from hydrogen gas. The pressure within the system is kept at about atmospheric by a control valve positioned on the hydrogen-methyl ethyl ketone separator 17. The catalyst in this run is sodium carbonate, 6 wt. percent—zinc oxide, 94 wt. percent supported on calcined coke. Under the conditions set forth above a conversion level of about 80% is reached.

The following points sum up the advantages accruing from the present process over those conventionally employed:

(1) The instant process permits the catalyst containing reactors to be made of inexpensive metals since they are subjected to lower temperatures.

(2) The catalyst life is markedly increased with substantial absence of coking within the reactors.

(3) Temperatures within the reactors are more easily controllable.

(4) When catalyst replacement is necessary, this can be done without shutting down the entire unit.

What is claimed is:

1. A continuous process of preparing methyl ethyl ketone which comprises first heating secondary butanol in a heating zone and passing the resultant hot butanol vapors through a first reaction zone packed with a metallic oxide dehydrogenation catalyst, maintaining the temperature within said reactor between about 650°–900° F. solely by introducing said vapors into said reactor at a temperature not above about 900° F. and removing the effluent gases at a temperature not substantially below 650° F., the residence time in said reactor being sufficient to effect conversion of at least 20% of the secondary butanol to methyl ethyl ketone, then heating the partially converted butanol product vapors and passing said vapors to at least one additional reaction zone under the same temperature conditions employed in the first said zone to permit the conversion of additional secondary butanol to methyl ethyl ketone, passing the effluent gases from a final catalyst packed reactor through a condensing zone and separating methyl ethyl ketone therefrom.

2. A continuous method of preparing methyl ethyl ketone, which comprises heating secondary butanol and passing the resulting hot butanol vapors to an inlet point of a reaction zone packed with a metallic oxide dehydrogenation catalyst, the temperature of said vapors at said inlet point being between about 800°–900° F., passing the hot vapors upwardly through said packed reaction zone thereby effecting at least a conversion of 20% of said butanol to methyl ethyl ketone, maintaining temperatures within said zone above about 650° F. in the absence of extraneous heating means, passing the effluent vapors through at least one additional heating and reaction zone under the same conditions as employed in the first heating and reaction zones until a conversion level of between 75–85% is reached, the residence time per reaction zone being between 10 and 200 seconds, passing the gaseous effluent from a final reaction zone to a cooling zone, cooling the product and separating methyl ethyl ketone therefrom.

3. A process in accordance with claim 2 wherein the secondary butanol is first vaporized and then heated to a temperature not above 950° F. for a short period of time which is insufficient to cause any substantial coking.

4. A method in accordance with claim 2 wherein said metallic oxide dehydrogenation catalyst comprises sodium carbonate and zinc oxide supported on a carrier.

5. A continuous method of preparing methyl ethyl ketone which comprises passing secondary butanol vapors through a heating zone for a short period of time insufficient to cause any substantial thermal reaction and coking, and whereby the vapors are heated to about 800°–900° F., passing the heated vapors through an insulated dehydrogenation catalyst containing reaction zone, maintaining the temperatures within said reaction zone between about 650°–900° F. by introducing said hot butanol vapors into said zone at a temperature between about 800°–900° F. and withdrawing effluent gaseous product mixture from said zone at a temperature above about 650° F., thereby effecting a conversion of at least a portion of said butanol to methyl ethyl ketone and hydrogen, passing the gaseous product mixture successively through at least one additional heating zone and reaction zone under the same conditions as employed in the first heating and reaction zone until a conversion level of between 75–85% is reached, the residence time per reaction zone being between 10 and 200 seconds, withdrawing gaseous effluent from a final reaction zone, cooling said effluent vapors containing hydrogen and crude methyl ethyl ketone and separating methyl ethyl ketone therefrom.

References Cited in the file of this patent

UNITED STATES PATENTS

| | | |
|---|---|---|
| 2,179,488 | Beamer | Nov. 14, 1939 |
| 2,516,958 | Coley | Aug. 1, 1950 |

FOREIGN PATENTS

| | | |
|---|---|---|
| 636,743 | Great Britain | May 3, 1950 |